Dec. 9, 1952    L. A. MEDLAR ET AL    2,621,231
APPARATUS FOR TESTING BATTERIES
Original Filed June 22, 1948                    2 SHEETS—SHEET 1

INVENTORS
LEWIS A. MEDLAR,
JAMES B. GODSHALK,
BY Stone, Boyden & Mack,
ATTORNEYS Dec. 9, 1952          L. A. MEDLAR ET AL         2,621,231

APPARATUS FOR TESTING BATTERIES

Original Filed June 22, 1948                    2 SHEETS—SHEET 2

INVENTORS
LEWIS A. MEDLAR,
JAMES B. GODSHALK,
BY Stone, Boyden & Mack,
ATTORNEYS Patented Dec. 9, 1952

2,621,231

UNITED STATES PATENT OFFICE 2,621,231

APPARATUS FOR TESTING BATTERIES

Lewis A. Medlar, Oreland, and James B. Godshalk, Philadelphia, Pa., assignors, by mesne assignments, to Fox Products Company, Philadelphia, Pa., a corporation of Pennsylvania Original application June 22, 1948, Serial No. 40,054. Divided and this application January 24, 1951, Serial No. 207,563

6 Claims. (Cl. 175—183)

This invention relates to apparatus for and methods of testing multiple cell storage batteries for the purpose of detecting potentially bad or weak cells.

The present application is a division of our copending application S. N. 40,054, filed July 22, 1948.

It is generally agreed that one reliable method of detecting bad cells is by means of the variation of voltage between the bad and good cells. The voltage of all cells in good condition and equal state of charge are equal within very small variations. When a cell begins to fail, it will exhibit an abnormally low voltage, as compared with good cells, and it is usually accepted that when this difference in voltage exceeds 0.1 to 0.2 volts, for a lead-acid battery under charge or discharge of at least 25 amperes, the cell can no longer be relied upon to do its full duty.

Heretofore, it has been the common practice to test batteries to detect faulty cells by means of voltmeters. In some cases a single voltmeter has been employed, this being connected successively to the terminals of each cell, and the reading noted. In other cases, a separate voltmeter for each cell has been used, these voltmeters being connected to all of the cells at the same time, and their readings compared.

All of these prior methods of testing batteries have had one thing in common, namely each cell voltage must be read by the operator and mentally compared by him with the others.

The general object of the present invention is to provide means for comparing the various cell voltages with each other automatically, and, when a predetermined difference in voltage exists, for immediately indicating that fact. This indication may be by means of a signal device such as a bell or light, or in case the battery is being charged or discharged during testing, it may be by means of a device serving to automatically stop the charge or discharge.

It has also been the common practice to test batteries while under a heavy discharge, so that the weakness of any faulty cell is accentuated. The same advantage can be attained by testing while the battery is undergoing charging at a high rate.

If the load on the battery during discharge comprises an oscillating vacuum tube, a motor with an irregular speed cycle, or any other apparatus giving rise to fluctuations or periodic variations in current, a pulsating current will flow through the battery. Similarly, when the battery is being charged by means of the usual transformer and rectifier a pulsating current is delivered by the rectifier and caused to flow through the battery.

In either case a still further object of the invention is to devise means for tapping off and utilizing a part of such pulsating current for the purpose of producing the indication or signal above referred to.

The broad principles of the invention may be carried out in a number of different ways and by means of various forms of apparatus, and in the following specification and accompanying drawings several different forms of apparatus are illustrated and described by way of example.

In order that the invention may be readily understood reference is had to the accompanying drawings forming part of this specification, and in which Figs. 1, 2 and 3 are elementary diagrams illustrating the principle on which one form of apparatus operates;

Figure 1:
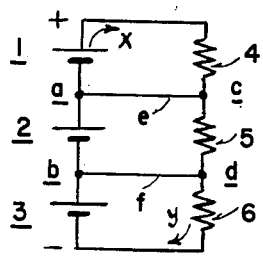
Figure 2:
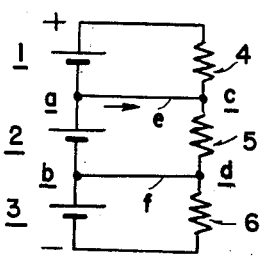
Figure 3:
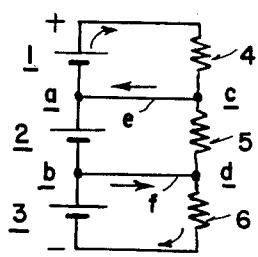

Referring to the drawings in detail and more particularly first to the elementary diagrams of Figs. 1, 2 and 3 these embody what may be called a resistor network. Illustrated in these diagrams is a storage battery shown as consisting of three cells 1, 2 and 3 connected in series, as is usual, the terminals of the battery being connected to the ends of a group of three resistors 4, 5 and 6, also joined in series. Thus, current from the battery will flow through and around the closed circuit described in the direction shown by the arrows $x$ and $y$ in Fig. 1.

If the resistance of the several resistors 4, 5 and 6 is proportional to the voltages of the respective cells 1, 2 and 3, then the junction points between adjacent resistors and between the respective adjacent pairs of cells will be at the same potential.

These junction points are indicated by the characters $a$, $b$, $c$, and $d$, and if the equi-potential points $a$ and $c$ are connected by a conductor $e$ no current will flow through this conductor. Similarly, if the equi-potential $b$ and $d$ are connected by a conductor $f$, no current will flow through this conductor, so long as the resistances of the several resistors are strictly proportional to the voltages of the respective cells across which they are connected. In batteries such as are usually met with in practice the normal voltages of the cells 1, 2 and 3 are equal and if the resistances 4, 5 and 6 are equal, then no current will flow through the conductors $e$ and $f$.

Assume now that for some reason cell 1 is weak or faulty, and its voltage is substantially lower than that of the other two cells. The junction points $a$ and $c$ are then no longer equi-potential points, but the potential at $a$ will be higher than the potential at $c$ and current will flow through the conductor $e$ in the direction of the arrow shown in Fig. 2. This is true because less current flows through the resistor 4 and consequently there is a smaller drop of potential through it. In Fig. 2 however, since the cells 2 and 3 are assumed to be still equal in voltage no current will flow through the conductor $f$ connecting the equi-potential points $b$ and $d$.

Assume next that, for some reason, the middle cell 2 is weak or faulty and its voltage lower than the two neighboring cells. Cell 1 being stronger than 2 will cause a current to flow through the conductor $e$ in the direction of the arrow in Fig. 3, while cell 3 being stronger than 2, will cause a current to flow through the conductor $f$, also as indicated by the arrow in Fig. 3. Thus if the middle cell is weak or faulty a current will flow through both conductors $e$ and $f$, although in opposite directions.

Assume finally that cell 3 is weak and its voltage abnormally low. Current will then flow through the conductor $f$, for the same reason that it flowed through conductor $e$ in Fig. 2, when it was assumed that cell 1 was weak.

Figure 4:
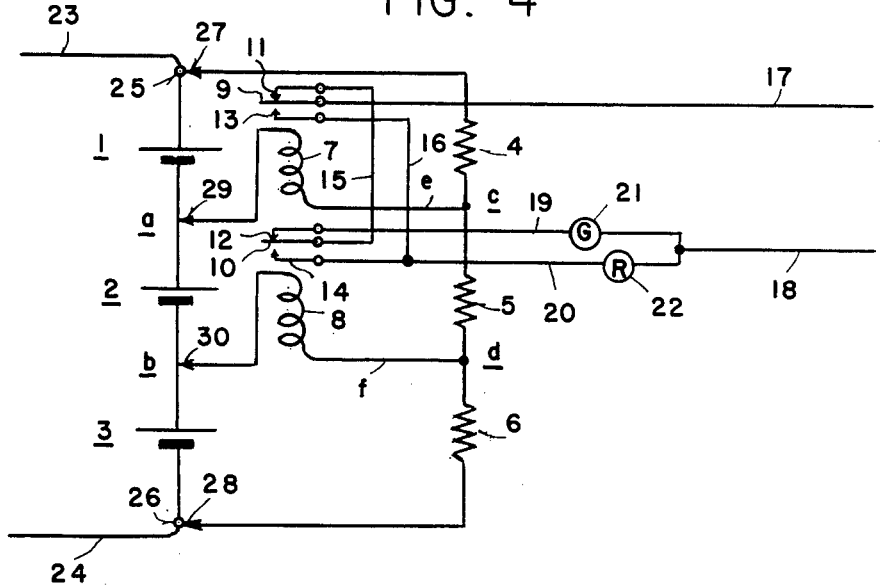
Fig. 4 is a circuit diagram showing an arrangement of apparatus operating on the principle illustrated in Figs. 1, 2 and 3.

The foregoing principles have been embodied in the form of testing apparatus illustrated in Fig. 4. In this figure, the same reference characters have been used, where applicable. The figure illustrates three battery cells 1, 2 and 3 connected in series as before and three resistors 4, 5 and 6, also connected in series with each other and the battery. The same cross conductors $e$ and $f$ are illustrated, but in the conductor E is included the winding 7 of an electromagnetic device in the nature of a relay and in conductor $f$ is included the winding 8 of a second electromagnetic device or relay.

These relays are provided with armatures 9 and 10, the armature 9 moving between fixed contacts 11 and 13 and the armature 10 moving between fixed contacts 12 and 14. The armature 10 is connected by wire 15 with the contact 11 while the contacts 13 and 14 are connected together by wire 16. Leads 17 and 18 extend to a suitable power supply, the lead 17 being connected with the armature 9 and the lead 18 being connected by wires 19 and 20 with the contacts 12 and 14. Signal devices 21 and 22, such for example as colored lights, are included in the connections 19 and 20, the light 21 being for example green, and the light 22 red.

23 and 24 designate leads through which current is either supplied to or drawn from the battery, these leads being connected to the usual binding posts 25 and 26.

The testing apparatus including the relays and signal lights above described is connected or applied to the battery by means of suitable contacts or clamps 27, 28, 29 and 30, the first two being applied to the binding posts 25 and 26, while the last two are applied to intermediate points between the cells 1 and 2, and 2 and 3, respectively.

Normally before the testing apparatus is connected to the battery the armatures 9 and 10 are in engagement with the contacts 11 and 12 as shown in the drawings. When the apparatus is applied to a battery as by means of the connectors 27 and 30, inclusive, if all of the cells are of substantially equal voltage, then, as described in connection with Fig. 1, no current flows through the conductors $e$ and $f$ and the relay windings 7 and 8 are not energized. Consequently, the armatures 9 and 10 remain in the position shown. Current then flows from the power lead 17 through armature 9, contact 11, wire 15, armature 10, contact 12, wire 19, and green light 21 to the other lead 18. This causes the green light to burn, thus indicating that the battery is in good condition, that is to say that all of the cells are of substantially equal voltage.

If, however, cell 1 should be weak or faulty, as indicated in Fig. 2, current would flow through the conductor $e$ and relay winding 7, thus pulling armature 9 down out of engagement with contact 11 and into engagement with contact 13. This cuts current off from the green light and current thereupon flows from the lead 17 through armature 19, contact 13, wires 16 and 20 and red light 22, to lead 18. This red light then immediately indicates to the operator that one of the cells is bad or faulty.

If on the other hand, the middle cell 2 is weak, as discussed in connection with Fig. 3, then current will flow through both conductors $e$ and $f$, and both relay windings 7 and 8 will be energized. This results in pulling both armatures 9 and 10 down into engagement with their respective contacts 13 and 14. Current then flows from lead 17 through armature 9, contact 13, wires 16 and 20 and red light 22 as before. Although armature 10 is in engagement with its contact 14 this produces no effect because wire 15 connected therewith is open at the contact 11.

Finally, if the end cell 3 is bad then current flows through the conductor $f$ and relay winding 8, thus energizing the latter, while relay winding 7 remains unenergized. Under these circumstances current flows from lead 17 through armature 9, contact 11, wire 15, armature 10, contact 14, and wire 20 through the red light 22 to the other lead as before.

Thus, regardless of whether one of the end cells or the middle cell is weak or of abnormally low voltage, the operator will instantaneously get a red signal, as soon as the connectors 27, 28, 29 and 30 are applied to the battery, this red signal indicating that one of the cells is bad.

For the sake of simplicity in the foregoing description, the various cells of the battery have been referred to as of normally equal voltage. It will of course be understood, however, that the only necessary relation is that the voltages of the several cells be proportional to the values of the respective resistors 4, 5 and 6.

It will be further understood that by properly designing the electromagnetic devices or relays they may be made to respond only to a certain predetermined difference in voltage between the cells, or the apparatus so constructed as to respond only to a predetermined departure from the normal voltage relationship.

In connection with the foregoing discussion, it should be explained that the impedance of the relay windings 7 and 8 must be relatively small as compared with that of the resistors 4, 5 and 6, in order that accurate results may be obtained.

Figure 5:
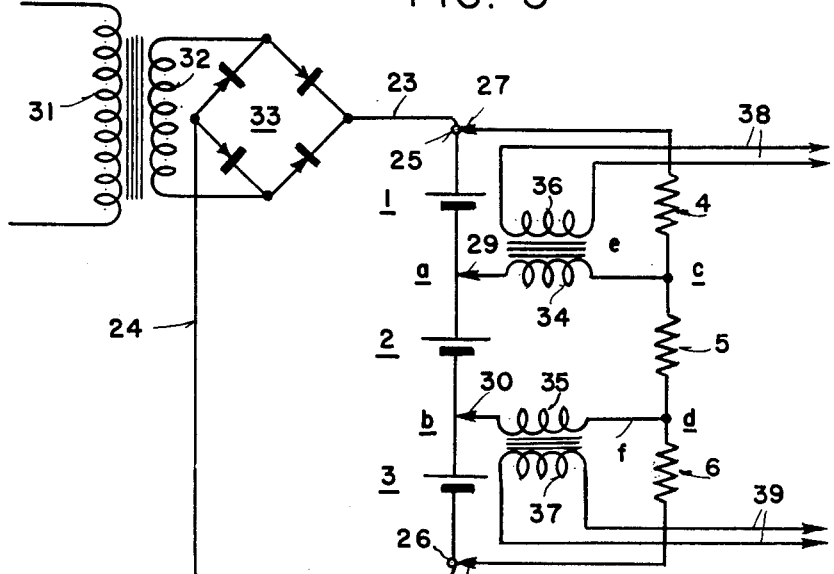
Fig. 5 is a circuit diagram showing another form of the invention in which the pulsating charging current is employed to produce the desired indication.

Referring now to Fig. 5, we have shown the same three battery cells and the same three resistors all connected in series, and we have illustrated the conventional transformer having a primary winding 31 and a secondary winding 32, the latter being connected to a suitable rectifier 33 for supplying uni-directional current for charging the battery. Owing to the action of the rectifier, this current will be of a pulsating nature.

The apparatus shown in Fig. 5 comprises the same conductors e and f, shown in the preceding figures but instead of the relay windings illustrated in Fig. 4 we employ in Fig. 5 transformer primary windings 34 and 35 included in the conductors e and f, respectively. Thus if cell 1 is weak current will flow through the transformer winding 34. If cell 2 is weak current will flow through both transformer windings 34 and 35, while if cell 3 is weak, current will flow through transformer winding 35 only, just as described in connection with the relay windings of Fig. 4. The two transformers have secondary windings 36 and 37 from which extend leads 38 and 39 to suitable signaling devices.

It will thus be understood that upon the occurrence of a predetermined departure from the normal voltage relationship of the several cells, current will flow through one or both of the conductors e and f and primary windings 34 and 35 as described, this current being derived from or tapped off of the pulsating charging current delivered to the battery. Upon passage of this pulsating current through the primary windings of the transformers it is converted into a true alternating current in the secondary windings of the transformers, and this alternating current is used to operate the signaling devices.

While we have shown and described the generation of this alternating current as due to the use of a pulsating charging current derived from the rectifier, a similar alternating current may be generated by the flowing of a pulsating current through the battery on discharge. If for example the load on the battery includes an oscillating vacuum tube a high frequency pulsating current will be set up. And, when such a battery is used on an automobile for starting purposes, if the starting motor operates with a regular speed cycle it also would serve to produce a low frequency pulsating current through the battery which could be passed through a transformer to produce an alternating current for signaling purposes. Thus, the invention contemplates the operation of indicating means by utilizing a part of a pulsating current flowing through the battery whether this pulsating current is produced on charge or on discharge.

In Figs. 4 and 5 the resistors 4, 5 and 6 constitute one specific example of what we shall designate generally as "translating devices" forming part of our improved testing apparatus adapted to be connected to a battery to indicate the existence of any abnormal voltage relationship between the cells.

Figure 6:
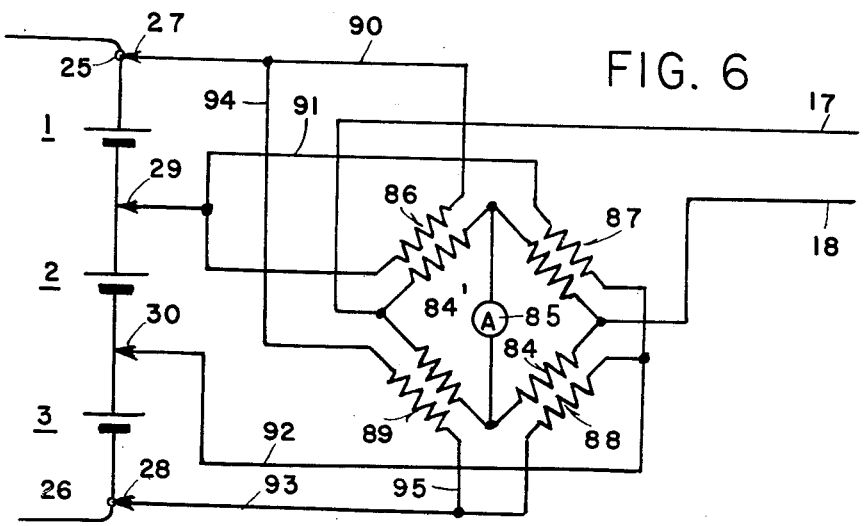
Fig. 6 is a circuit diagram showing still another form of testing apparatus operating on the principle of a Wheatstone bridge.

Referring now to Fig. 6, we have shown an arrangement of testing apparatus which operates on a different principle. In this figure the translating devices take the form of heating coils or elements, designated 86, 87, 88 and 89. Heating element 86 is connected across cell 1 by means of wire 90 and connector 29. Heating element 87 is connected across cell 2 by means of wires 91 and 92. Heating element 88 is connected across cell 3 by means of wires 92 and 93, while heating element 89 is connected across all three cells in series by means of wires 94 and 95. Heating elements 86, 87 and 88 are also connected in series across all three cells, the same as resistors 4, 5 and 6 in Fig. 4.

Closely associated with each heating coil or element is a thermally sensitive resistor 84, all four of such resistors being equal and included in the four arms of a Weatstone bridge. A suitable indicating device 85 is connected across two of the opposite corners of the bridge while the power leads 17 and 18 are connected to the other two corners.

If the cells 1, 2 and 3 are of normally equal voltage, the heating coils 86, 87 and 88, connected across the individual cells, are also equal. The coil or element 89 however, which is connected across all of the cells in series is of such resistance as to generate the same amount of heat as the other three elements.

From the foregoing, it will be obvious that if all of the cells of the battery to which the testing apparatus is applied have the normal voltage relationship, then the bridge will be balanced and the indicating device 85 will show that the battery is in good condition. If, however, the voltage of one of the cells is abnormally low, then the current flowing through the particular heating element connected across that cell will be less than normal. Thus the heating effect of that particular element will be reduced and the thermally responsive resistor with which it is associated will be affected in such a way as to unbalance the bridge, and the signal device 85 will thereupon indicate that there is a departure from the normal voltage relationship of the cells.

Figure 7:
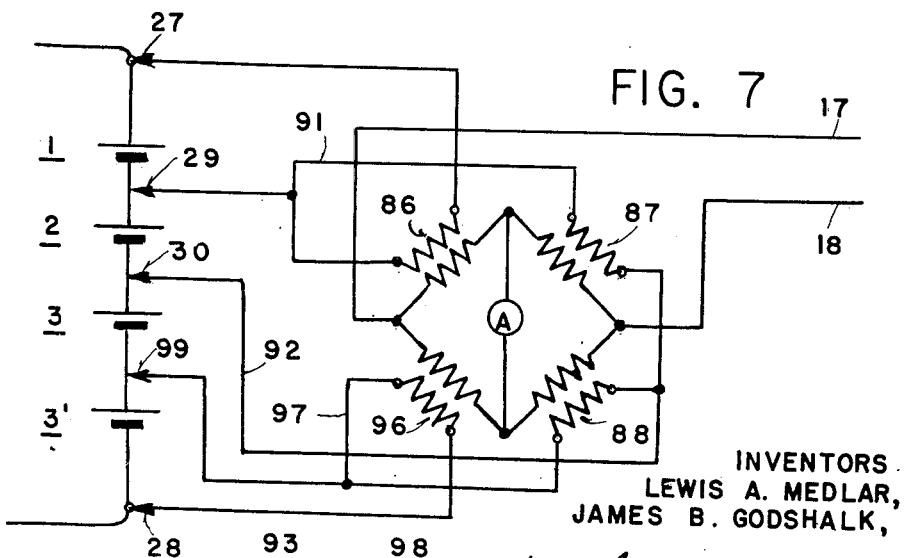
Fig. 7 is a circuit diagram similar to Fig. 6, but showing apparatus designed to test a battery consisting of four cells instead of three.

Referring finally to Fig. 7 this figure illustrates a Wheatstone bridge arrangement similar to Fig. 6, but shows a slight modification by which the apparatus is adapted for testing batteries consisting of four cells, instead of three.

It will be observed that in Fig. 7 we have illustrated four cells, 1, 2, 3, and 3' connected in series, and the only difference between the apparatus of Fig. 7 and that of Fig. 6 is a slight rearrangement of the heating coils or elements. While in Fig. 6 the fourth heating coil or element 89 is shown as connected across the entire battery, in Fig. 7 the fourth heating coil or element, designated 96, is connected by wires 97 and 98 across the fourth cell 3'. All of the heating elements are in series across all of the cells, as before. In this case, if the normal voltage of the four cells is equal, then all of the heating elements 86, 87, 88 and 96 are of equal value, and exert the same heating effect upon the resistors in the arms of the bridge. In order to apply this apparatus to a four cell battery, an additional connector 99 tapping the battery between the cells 3 and 3' is of course required, this connector being shown as connected with wire 93.

While in Figs. 4 and 5, we have illustrated a battery of three cells, and described the operation of the invention as applied to such a battery, it will of course be understood that the invention is applicable to batteries of any number of cells. All that is necessary, to adapt the invention to batteries of a larger number of cells is to add another resistor and relay for each additional cell in the battery, and suitably interconnect the contacts. In the case of Fig. 5, transformers would, of course, be added, instead of relays.

It will therefore be seen that in all of the modifications we have provided battery testing apparatus comprising a plurality of translating devices which, when connected to the battery in such a manner that the voltages of the several cells are simultaneously impressed thereon, serves to instantaneously compare such voltages and to automatically indicate the existence of any predetermined departure from a normal voltage relationship.

What we claim is:

1. Apparatus for testing batteries made up of at least three cells connected in series and having a certain normal voltage relationship to each other, said apparatus comprising a number of translating devices equal to the number of cells, all of which translating devices are joined in series, means for connecting the junction point between each adjacent pair of translating devices with the junction point of each respective adjacent pair of cells, the resistance of said translating devices being substantial and approximately proportional to the normal voltage of the particular cells across which they are respectively connected, and means controlled by the difference in current flowing through any two of the said several translating devices, in response to a predetermined change in said normal voltage relationship of the cells for automatically indicating the occurrence of such change.

2. Apparatus for testing batteries having at least three cells of approximately the same normal voltage connected in series, comprising a plurality of electrical conducting elements, each of substantial and approximately equal resistance, all of said conducting elements being joined in series, means for connecting the junction point between each adjacent pair of conducting elements with the junction point of each respective adjacent pair of cells, an electromagnetic device having a winding of relatively small resistance included in each of said connections, and means controlled by said devices for automatically indicating the existence of a predetermined difference in the voltage of any one cell relative to that of an adjacent cell.

3. Apparatus for testing batteries having at least three cells connected in series, comprising an equal number of relatively high resistances joined in series, means for connecting the junction point between each adjacent pair of resistances with the junction point of each respective adjacent pair of cells, an electromagnetic device having a winding of relatively low resistance included in each of said connections, the arrangement being such that the number of said electromagnetic devices is one less than the number of cells or resistances, and signal means controlled by said devices.

4. Apparatus for testing batteries having at least three cells of approximately the same normal voltage connected in series, comprising an equal number of electrical conducting elements each of substantial and approximately the same resistance, all of said conducting elements being joined in series, means for connecting the junction point between each adjacent pair of conducting elements with the junction point of each respective adjacent pair of cells, and means controlled by variations in the amount of current flowing through any two of the said several electrical conducting elements due to a predetermined change in the normal voltage relationship of the cells for automatically indicating the occurrence of such change.

5. Apparatus for testing batteries having at least three cells of approximately the same normal voltage connected in series, comprising an equal number of electrical conducting elements each of substantial and approximately the same resistance, all of said conducting elements being joined in series, means for connecting the junction point between each adjacent pair of conducting elements with the junction point of each respective adjacent pair of cells, a plurality of electromagnetic devices each comprising a magnetic core having two windings, one of such windings being included in each of said connections, and the other of said windings being connected in circuit with a signal device, the arrangement being such that no current flows through said first mentioned windings so long as the voltages of said cells remain equal, and means controlled by current flowing in any of said first mentioned windings due to a difference in voltage of one cell relative to the others for governing the flow of current in said corresponding other winding so as to cause said signal device to automatically indicate the existence of such voltage difference.

6. Apparatus for testing batteries having a plurality of cells of approximately equal normal voltage connected in series, comprising a plurality of electrical conductors, each containing a heating element, of substantial and approximately equal resistance, all of said heating elements being joined in series, means for connecting the junction point between each adjacent pair of heating elements with the junction point of each respective adjacent pair of cells, a Wheatstone bridge having arms each containing a thermally sensitive resistance, each of said resistances being closely associated with a different one of said heating elements, and means operated by said Wheatstone bridge, and governed by a variation in current flowing through said several heating elements in response to a difference in voltage of one cell relative to the others for indicating the existence of such voltage difference.

LEWIS A. MEDLAR.
JAMES B. GODSHALK.

REFERENCES CITED

The following references are of record in the file of this patent:

UNITED STATES PATENTS

| Number | Name | Date |
| --- | --- | --- |
| 851,149 | Woodbridge et al. | Apr. 23, 1907 |
| 1,523,803 | Goodwin | Jan. 20, 1925 |
| 1,721,409 | Pohl | July 16, 1929 |
| 2,382,908 | Peterson | Aug. 14, 1945 |

FOREIGN PATENTS

| Number | Country | Date |
| --- | --- | --- |
| 898,489 | France | Apr. 24, 1945 |